(12) United States Patent
Kitamura et al.

(10) Patent No.: US 7,346,685 B2
(45) Date of Patent: Mar. 18, 2008

(54) METHOD AND APPARATUS FOR LIMITING MANAGEMENT OPERATION OF A STORAGE NETWORK ELEMENT

(75) Inventors: Manabu Kitamura, Cupertino, CA (US); Shoji Kodama, San Jose, CA (US); Yuichi Taguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 203 days.

(21) Appl. No.: 10/916,556

(22) Filed: Aug. 12, 2004

(65) Prior Publication Data

US 2006/0036736 A1    Feb. 16, 2006

(51) Int. Cl.
*G06F 15/173* (2006.01)
(52) U.S. Cl. .......................................... 709/225; 726/4
(58) Field of Classification Search ........ 709/223–229; 726/1–6, 16–21; 711/154–166; 707/8–10
See application file for complete search history.

(56) References Cited

U.S. PATENT DOCUMENTS

| | | | |
|---|---|---|---|
| 5,809,230 A * | 9/1998 | Pereira | 726/35 |
| 5,964,886 A | 10/1999 | Slaughter et al. | |
| 6,098,128 A | 8/2000 | Velez-McCaskey et al. | |
| 6,101,508 A | 8/2000 | Wolff | |
| 6,161,191 A | 12/2000 | Slaughter et al. | |
| 6,757,695 B1 | 6/2004 | Noveck et al. | |
| 6,769,022 B1 | 7/2004 | DeKoning et al. | |
| 6,886,100 B2 * | 4/2005 | Harrah et al. | 726/3 |
| 7,003,642 B2 * | 2/2006 | Dawkins et al. | 711/164 |
| 7,010,528 B2 * | 3/2006 | Curran et al. | 707/8 |
| 2002/0138691 A1 | 9/2002 | Yamamoto et al. | |
| 2002/0199071 A1 * | 12/2002 | Kitamura et al. | 711/152 |
| 2003/0085914 A1 | 5/2003 | Takoaka et al. | |
| 2004/0128311 A1 | 7/2004 | Ito et al. | |
| 2006/0114917 A1 * | 6/2006 | Raisch | 370/401 |

FOREIGN PATENT DOCUMENTS

JP    2002334048    11/2002

OTHER PUBLICATIONS

J. Oltsik, Storage Security-Mar. 2004: What Users Should Demand of Vendors, ESG Enterprise Strategy Group, no date.

* cited by examiner

*Primary Examiner*—Saleh Najjar
*Assistant Examiner*—Philip Scuderi
(74) *Attorney, Agent, or Firm*—Mattingly, Stanger, Malur & Brundidge, P.C.

(57) ABSTRACT

A method, apparatus and computer program for implementing a storage management system for limiting management operation of a storage network element by determining whether the storage network element is related to a host computer and determining whether the management operation is restricted based on the host computer and the time at which the management operation is to be conducted. The invention is set forth in a system including a network, a plurality of storage network elements connected to the network, and the storage management system, connected to the network, for controlling storage management operation of the storage network elements in response to operation requests from users of the storage management system. Each of the storage network elements is related to at least one of a plurality of host computers and information of these relations is used to determine whether a management operation can be conducted on the storage network element.

49 Claims, 8 Drawing Sheets

FCS: FibreChannel Switch

| ELEMENT | RESTRICTED FUNCTION |
|---|---|
| STORAGE | LU Detach, LU Masking... |
| SWITCH | ZONE Create, ZONE Delete, CONFIG Create... |

| HOST | VOLUME | ZONE | RESTRICTED TIME |
|---|---|---|---|
| a | 0, 4, 5, 6 | ZONE A | NULL |
| b | 1, 2 | ZONE B | 9:00-17:00 |
| c | 2, 3, 10 | ZONE B | 9:00-17:00 |
| ⋮ | ⋮ | | |
| n | | | NULL |

| STORAGE | VOLUME |
|---|---|
| 1 | 0, 1, 2, 3 |
| 2 | 4, 5, 6, 7 |
| 3 | 10, 11, 12 |
| ⋮ | ⋮ |
| M | |

| SWITCH | ZONE |
|---|---|
| 1 | ZONE A, ZONE B |
| 2 | ZONE C |
| ⋮ | ⋮ |
| N | |

| HOST | VOLUME | ZONE | RESTRICTION |
|---|---|---|---|
| 1 | 0, 1, 2, 3... | ZONE A | YES |
| 2 | 1, 12, 13,... | ZONE B | YES |
| 3 | 0, 2, 4, 11,... | ZONE A | NO |
| ⋮ | ⋮ | | |
| N | | | YES |

| User ID | User Level | Description |
|---|---|---|
| Alan | High | System Administrator |
| Mike | Mid | Sales Dept Manager |
| Bill | Low | User |
| ⋮ | ⋮ | ⋮ |

| User Level | Restricted Time |
|---|---|
| High | NULL |
| Mid | 9:00-17:00 |
| Low | 0:00-24:00 |

METHOD AND APPARATUS FOR LIMITING MANAGEMENT OPERATION OF A STORAGE NETWORK ELEMENT

BACKGROUND OF THE INVENTION

The present invention relates generally to limiting management operation of a storage network element. More particularly the present invention relates to a method, apparatus and computer program for limiting management operation of a storage network element by determining whether the storage network element is related to a host computer and whether the management operation is restricted.

In a computer system, including storage systems, there may exist a situation where changes to the configurations of the storage systems or any other storage network element, such as network switches, should be prohibited during certain periods of time. For example, in a stock market exchange or a foreign exchange market, changes in the configurations of the storage systems or the Fibre Channel networks are conducted while the market is closed so as not to improperly effect normal operation of the exchanges.

Storage management software includes means for giving a privilege of changing configurations of the storage network elements to user groups or each user of each user group. Examples of such means includes User level Access privilege and Function/Object level access limitation.

User level Access privilege provides means wherein the storage management operation from an unauthorized user is rejected. Each user is authenticated by a password. Alternatively, there may be another case that only one user is permitted to perform all storage management operations including configuration changes and the other users can only view the system configuration but cannot make configuration changes.

Function/Object level access limitation provides means wherein the operations that each user group can perform are limited. For instance, the management software can provide different types of privileges to, for example, a "server administrator group" as opposed to a "storage administrator group". According to this means, for example, the server administrator group may not be permitted to change the configurations of storage systems or storage network elements, whereas the storage administration group may have such privileges. These privileges could, for example, include volume creation or Fibre Channel switch settings. Access to some storage systems or network switches may also be limited according to authorized user groups.

However, the above means do not disclose techniques for restricting management operations according to host computers and permitted operations.

Other technology has also been proposed. For example, U.S. Patent Application Publication No. 2002/0138691 A1 (Yamamoto) discloses a method and system for managing access to storage resources according to access time. Particularly Yamamoto discloses that the storage system does not accept I/O operation from the host computers during a certain period of time. However, Yamamoto does not disclose that the storage system or the storage management computer can prohibit management operations from being conducted.

"Storage Security-March 2004: What Users Should Demand of Vendors", by J. Oltsik, Enterprise Strategy Group, March 2004 (Oltsik) suggests that management operations could be limited based on time. However, Oltsik does not disclose any details as to how such could be accomplished.

Each of the technologies described above suffers from various disadvantages particularly that they can not limit management operations of a storage network element according to whether the storage network element is related to a host computer and whether the management operation is restricted. Therefore, technology which overcomes these disadvantages is needed.

SUMMARY OF THE INVENTION

The present invention provides a method, apparatus and computer program for limiting management operation of a storage network element by determining whether the storage network element is related to a host computer and whether the management operation is restricted based on the host computer.

The method, apparatus and computer program according to the present invention are provided in a system including a network, a plurality of storage network elements connected to the network, and a storage management system, connected to the network, for controlling storage management operation of the storage network elements in response to operation requests from users of the storage management system. Each of the storage network elements is related to at least one of a plurality of host computers.

Further, according to the present invention the storage management system includes a network interface which connects the storage management system to the network, and a storage manager which determines whether an operation request received from an user is related to management of a storage network element. If an operation request is related to management of a storage network element, then the storage manager determines whether the operation request is a restricted operation request. If the operation request is a restricted operation request, then the storage manager determines which of the host computers to which the storage network element is related.

If at least one of the host computers is determined to be related to the storage network element, then the storage manager determines whether execution of the operation request is permitted on the storage network element according to the related at least one of the host computers and a time at which the execution is to be conducted, and if the execution of the operation request is permitted, then the storage manger executes the operation request on the storage network element.

The storage network element according to the present invention can be either a storage system or a network switch. Further, the functions performed by the storage management system could, for example, be performed by one of the storage network elements.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

FIG. 5 illustrates a host management table 200 according to the present invention;

FIG. 6 illustrates a volume management table 300 according to the present invention;

FIG. 7 illustrates a zone management table 350 according to the present invention;

FIG. 10 illustrates a host management table 200' according to the present invention;

FIG. 11 illustrates an user management table 600 according to the present invention;

FIG. 12 illustrates an user level information table 650 according to the present invention.

DETAILED DESCRIPTION OF THE INVENTION

The present invention as will be described in greater detail below provides an apparatus, method and computer program, particularly, for example, a storage management system for limiting management operation of a storage network element by determining whether the storage network element is related to a host computer and whether the management operation is restricted. The present invention provides various embodiments as described below. However it should be noted that the present invention is not limited to the embodiments described herein, but could extend to other embodiments as would be known or as would become known to those skilled in the art.

Figure 1:
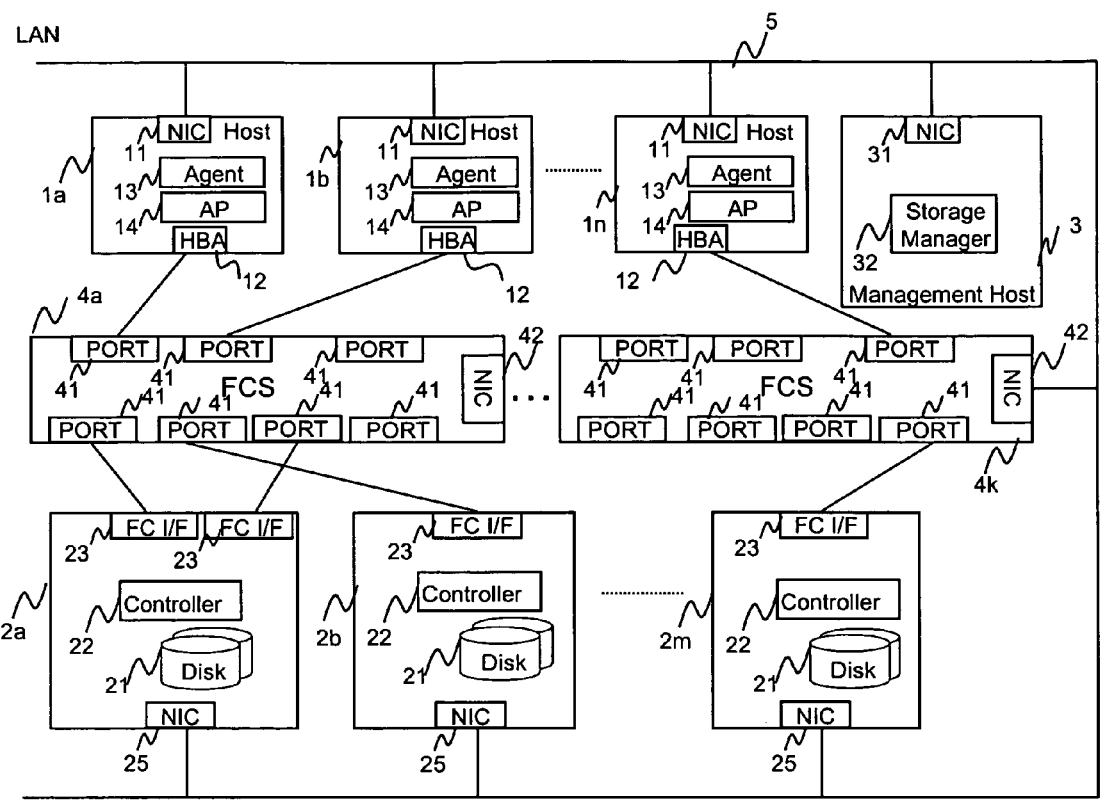
FIG. 1 is a diagram for explaining an example system in which the method, apparatus and computer program for conducting management operations on storage network elements according to the present invention are applied.

The present invention operates in a system having a configuration such as that illustrated in FIG. 1. The system includes a plurality of host computers 1*a-n* (n being an integer), a plurality of storage systems 2*a-m* (m being an integer that may be different from n), a management host computer 3, at least one network switch 4 that could, for example, be a Fibre Channel Switch, for implementing a networking function between the host computers 1*a-n* and the storage systems 2*a-m*, and a Local Area Network (LAN) 5 for interconnecting the host computers 1*a-n*, storage systems 2*a-m*, management host computer 3 and network switches 4*a-k* to permit management operations and other communications to be performed on and between the elements. As noted above more than one network switch 4 can be provided so as to handle networking functions in a larger system and/or provide alternative paths for communications. For the purposes of discussion the network switches 4*a-k* will be described below as Fibre Channel Switches. However, the present invention is not limited to such an embodiment.

Each storage system 2*a-m* includes a plurality of disks 21, a disk controller 22 for controlling operation of the disks 21, an interface (I/F) that could, for example, be a Fibre Channel Interface (FC I/F) 23 for interfacing with the network switches 4*a-k*, and Network Interface Controller (NIC) 25 for interfacing with the LAN 5. In another embodiment, each storage system 2*a-m* may support Internet Protocol (IP) based Input/Output (I/O) accessing protocols such as Internet Small Computer System Interface (iSCSI). In this case, instead of FC I/F 23, each of the storage systems 2*a-m* would include another NIC, and Fibre Channel Switches 4*a-k* are replaced by LAN switches.

Fibre Channel Switches 4*a-k* include a plurality of ports 41 each being connected to one of the host computers 1*a-n* or one of the storage systems 2*a-m*. Each of the Fibre Channel Switches 4*a-k* also includes a NIC 42 which is connected to the management host computer 3 via LAN 5.

Each host computer 1*a-n* includes a NIC 11 and a Host Bus Adapter (HBA) 12. The NIC 11 is used for connecting the host computer 1*a-n* to the management host computer 3 via the LAN 5. The HBA 12 is used for connecting the host computer 1*a-n* to the Fibre Channel switches 4*a-k*. Although not shown, each host computer 1*a-n* further includes a Central Processing Unit (CPU) and a memory. Each of the host computers 1*a-n* still further includes an application program (AP) 14 which is executed by the CPU using the memory. The CPU using the memory can also execute other programs such as an Operating System (OS).

The management host computer 3 includes a NIC 31 and a storage manager 32. Although not shown, the management host computer 3 further includes a Central Processing Unit (CPU) and a memory. The NIC 31 connects the management host computer 3 to each of the host computers 1*a-n*, storage systems 2*a-m* and Fibre Channel Switches 4*a-k* via the LAN 5. The storage manager 32 is a program having a Graphical User Interface (GUI), and is executed by the CPU using the memory included in the management host computer 3. Still further, although not shown, the management host computer 3 includes a display, keyboard and mouse. Users, such as system administrators, operate the storage manager 32 using the display, keyboard and mouse included in the management host computer 3. The storage manager 32 allows a user to conduct management operations on the storage network elements including the storage systems 2*a-m* and the Fibre Channel switches 4*a-k* of the system.

In another embodiment of the present invention the storage manager 32 may also include an application program interface (API) or a command line interface (CLI) (not shown) to permit the storage manager 32 to receive instructions from the application programs 14 to conduct management operations on the storage elements including the storage systems 2*a-m* and the Fibre Channel switches 4*a-k* of the system. Thus, for example, the application program 14 may issue a management operation request to the storage manager 32 using the API or CLI via LAN 5 and the storage manager 32 in response to the management operation request conducts the requested management operation.

The storage manager 32 performs management operations in the above described system as illustrated in FIG. 1. There are, for example, at least two kinds of operations that the storage manager 32 performs, namely a viewing operation and a changing/modifying operation.

A viewing operation can, for example, be of many different types including displaying network topology and collecting event information of the storage network elements.

When performing the viewing operation of displaying the network topology, the storage manager 32 collects all information about the storage network elements, including the storage systems 2a-m, Fibre Channel Switches 4a-k, and host computers 1a-n, and displays a topology of the network on the display of the management host computer 3 based on the collected information, thereby graphically illustrating to users of the management host computer 3 how the host computers 1a-n, storage systems 2a-m and Fibre Channel Switches 4a-k are interconnected to each other.

When performing the viewing operation of collecting event of the storage network elements, the storage manager 32 collects event information concerning the storage network elements including error information and information that a new device is added to or deleted from the Fibre channel Switches 4a-k, etc., and displays such information on the display of the management host computer 3. Thus, the storage manager 32 graphically illustrates to users of the management host computer 3 events that occurred in each of the storage network elements.

A changing/modifying operation changes the configurations and/or settings of the storage network elements including the storage systems 2a-m and the Fibre Channel Switches 4a-k. There are various types of changing/modifying operations.

Figure 2:
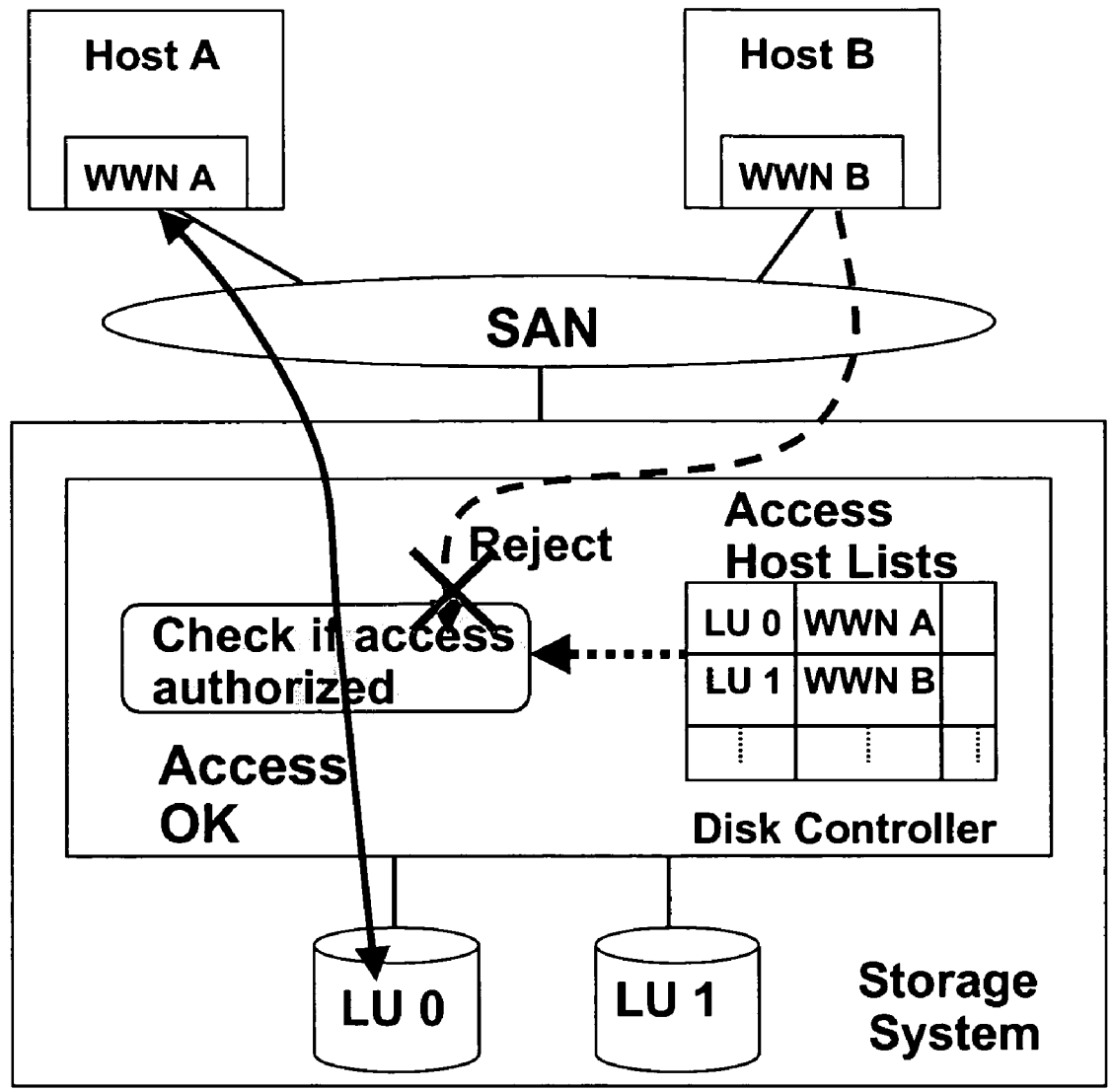
FIG. 2 is a diagram for explaining Logical Unit (LU) masking performed by a storage system limiting access from a host computer to an indicated LU according to the present invention.

The changing/modifying operations include changing configurations of the storage systems 2a-m such as attaching or detaching a LU to the host computers 1a-n, allowing or prohibiting access to the LUs from the host computers 1a-n, etc. Allowing or prohibiting access to LUs is sometimes called LUN Masking. An example of LUN Masking is illustrated in FIG. 2 and is disclosed, for example in U.S. Pat. No. 6,484,245.

It should be noted a LU is a storage region accessible to a host computer 1a-n. A LU may correspond to a disk 21, or may comprise all or portions of a plurality of disks 21. A volume is almost the same as a LU. Each volume may be the same as disk 21, or each volume may comprise all or portions of a plurality of disks 21. In the present invention the storage manager 32 assigns all volumes with a unique number and manages them using said numbers.

As illustrated in FIG. 2 LUN masking when implemented, limits access to the storage system according to the identity of the host computer seeking access and the LUN to which access is be sought. As illustrated in FIG. 2 each of the host computers is assigned to a particular LUN by an access host list included in the storage system. Thus, as illustrated in FIG. 2 host computer A is assigned to LUN 0 and host computer B is assigned to LUN 1. Therefore, if host computer A seeks access to LUN 0, then based on the access host list such access is authorized. However, if host computer B seeks access to LUN 0, then based on the access host list such access is rejected.

Figures 3, 4:
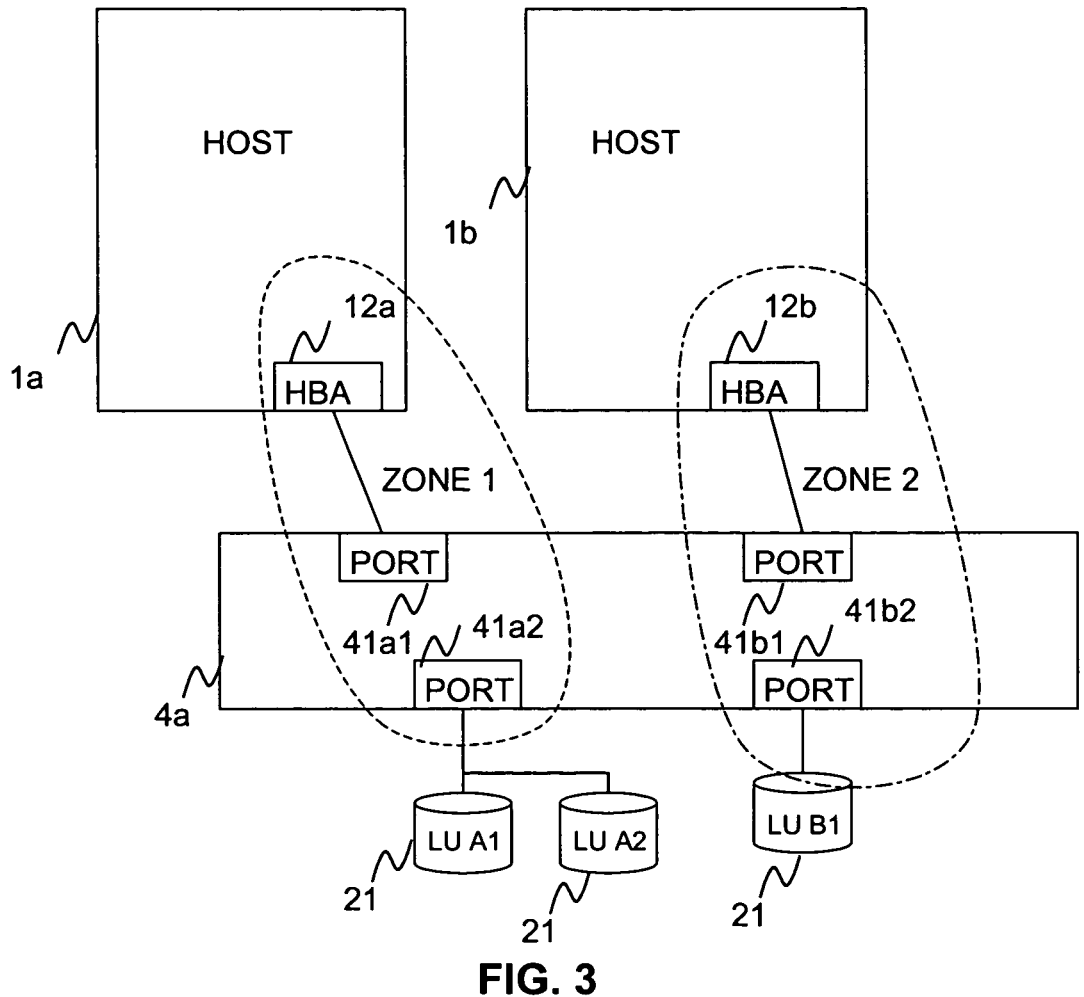
FIG. 3 is a diagram for explaining a zoning function as implemented by a network switch to divide the network switch into a plurality of zones according to the present invention.
FIG. 4 illustrates a restricted operation table 500 according to the present invention.

The changing/modifying operations further include changing configurations of the storage network (Fibre Channel switches 4a-k) including changing zoning. One of the functions included in the Fibre Channel Switches 4a-k is a zoning function which divides a physical switch into a plurality of virtual zones. This function is used for providing security in each host. An example of zoning is shown in FIG. 3. Zone 1 of the Fibre Channel Switch 4a includes HBA 12a of host computer 1a, port 41a1 which is connected to HBA 12a and port 41a2 which is connected to particular volumes or LUs, namely LU A1 and LU A2. Zone 2 of the Fibre Channel Switch 4a includes HBA 12b of host computer 1b, port 41b1 which is connected to HBA 12b and port 41b2 which is connected to particular volumes or LUs, namely LU B.

According to the present invention a viewing operation does not affect the configuration of the storage network elements including the storage systems 2a-m or Fibre Channel Switches 4a-k. However, a changing/modifying operation does affect the configuration of the storage systems 2a-m or the Fibre Channel Switches 4a-k and the operation of the host computers 1a-n or application programs 14. For example, if one of the LUs is deleted while a host computer 1a-n is accessing the LU, then the host computer 1a-n can not continue the operation. Therefore, according to the present invention the changing/modifying operations need to be restricted so as to be performed during certain periods of time.

FIG. 4 illustrates a restricted operation table 500 that the storage manager 32 maintains so as to manage the types of operations that qualify as changing/modifying operations. As illustrated in FIG. 4 the first column identifies the storage network element of concern and the second column indicates the restricted operations that affect the configuration of the storage network elements. Thus, as illustrated in FIG. 4 row 501 indicates the kinds of operations that affect the configuration of the storage systems 2a-m, and row 502 indicates the kinds of operations that affect the configuration of the Fibre Channel Switches 4a-k. Each restricted operation such as "LU detach", "ZONE create" may be a command that is used for the command line interface (CLI), or it may be a kind of Application Program Interface (API) such as a C programming language function. The contents of the restricted operation table 500 may be predetermined, or may be input to the management host computer 3 by the users.

FIG. 6 illustrates a volume management table 300. This table manages relations between storage systems 2a-m and volumes to indicate which volume is in which storage system 2a-m. Storage manager 32 manages all storage systems 2a-m and volumes included therein by assigning them a unique identifying number. An identifying number that is equal to or greater than 1 is assigned to each of the storage systems 2a-m as per column 301, and an identifying number that is equal to or greater than 0 is assigned to each of the volumes as per column 302. Thus, in FIG. 6 the storage system 2a-m having an identifying number of 1 has volumes numbered 0, 1, 2 and 3. Whereas, the storage system 2a-m having an identifying number of 2 has volumes numbered 4, 5, 6 and 7, and the storage system 2a-m having an identifying number of 3 has volumes numbered 10, 11 and 12.

FIG. 7 illustrates a zone management table 350. This table 350 manages relations between the Fibre Channel Switches and the zones. Each Fibre Channel Switch 4 can create one or more zones using the zoning function. Each Fibre Channel Switch 4 has a unique identifying number as per column 351 and each zone has a unique name that is indicated as being related to a particular Fibre Channel switch 4 identified by its unique identifying number as per column 352. Thus, as illustrated in FIG. 7 the Fibre Channel Switch having the identifying number 1 includes zones A and B, whereas, the Fibre Channel switch having the identifying number 2 includes zone C.

FIG. 5 illustrates a host management table 200. This table manages the relationship between the host computers 1a-n, volumes, zones and restricted times, thereby indicating which of the volumes each host computers 1a-n can access, in which zone each host computer 1a-n belongs and times at which access to the volumes is restricted. Thus, the restricted time field 204 manages the times when the settings related to the configurations or zones of the storage network elements, including the storage systems 2a-m or Fibre channel switches 4a-k, must not be changed. Accordingly, as per FIG. 5, field 201 identifies the host computers 1a-n, field 202 identifies the volumes, field 203 identifies the zones and the field 204 indicates the restricted times.

Therefore, for example as per FIG. 5, in the first row regarding host computer a, the table 200 indicates that host computer a can access volumes 0, 4, 5 and 6 and that host computer a belongs to zone A. Also, for example as per FIG. 5, regarding host computer A, the table 200 indicates there is no restricted time. Accordingly any configuration changes of the storage systems 2a-m and/or the Fibre Channel switches 4a-k to which the volumes and the zone belong can be conducted at anytime.

Further, for example as per FIG. 5, in the second row regarding host computer b, the table 200 indicates that host computer b can access volumes 1 and 2, and that host computer b belongs to zone B. Also, for example as per FIG. 5, regarding host computer b, the table 200 indicates the restricted time is 9:00-17:00. Accordingly any configuration changes of the storage systems 2a-m and/or the Fibre Channel switches 4a-k to which the volumes and the zone belong must not be conducted during 9:00-17:00.

Still further, for example as per FIG. 5, in the third row regarding host computer c, the table 200 indicates that host computer c can access volumes 2, 3 and 10 and that host computer c belongs to zone B. Also, for example as per FIG. 5, regarding host computer c, the table 200 indicates the restricted time is 9:00-17:00. Accordingly any configuration changes of the storage systems 2a-m and/or the Fibre Channel switches 4a-k to which the volumes and the zone belong must not be conducted during 9:00-17:00.

With respect to the host computer b on the second row of the host management table 200 of FIG. 5 and referring to FIG. 6 and FIG. 7, the volumes 1 and 2 belong to storage system 2a-m whose identifier is "1", and the zone B belongs to the Fibre Channel Switch "1". Therefore, the storage manager 32 can recognize that it must prohibit the any configuration changes of storage system "1" and the Fibre Channel switch "1".

The various fields including the host computer 201, volume 202, and zone 203 fields of the host management table 200 can, for example, be automatically created by the storage manager 32 when the storage manager 32 starts working (initialization). Also, the storage manager 32 checks the system as illustrated in FIG. 1 periodically so as to determine which host computers 1a-n, storage systems 2a-m, or Fibre Channel switches 4a-k may exist in the system, and each row of the table 200 is updated (added or deleted) according to when the host computers 1a-n, storage systems 2a-m, or Fibre Channel switches 4a-k are added or deleted in the system.

Users of the management host computer 3 can input to the storage manager 32 information that is to be stored in the restricted time field 204 via the GUI of the storage manager 32. Alternatively in another embodiment, the host computer field 201 can, for example, be manually input by the users (e.g. system administrator), and the volume 202 and zone 203 fields can, for example, be updated automatically based on information about LUN masking and zoning. Since the update of these fields (volume 202, zoning 203) is realized by using a common technique that is known in the storage management software and is not directly related to the point of the present invention, a description of this technique is omitted.

According to the present invention, the host management table 200 as illustrated in FIG. 5 manages relations between host computers 1a-n, volumes, zones and restricted times. However, in another embodiment, instead of the host computers 1a-n, it is also possible to manage relations between the application programs 14, the volumes, zones and restricted times. According to this embodiment of the present invention, the restricted time field 204 can indicate the time when the application programs 14 are not in use. Thus, this embodiment indicates the times when configuration changes to the storage systems 2a-m or the Fibre Channel switches 4a-k are not to be conducted according to when the application programs are used.

Figure 8:
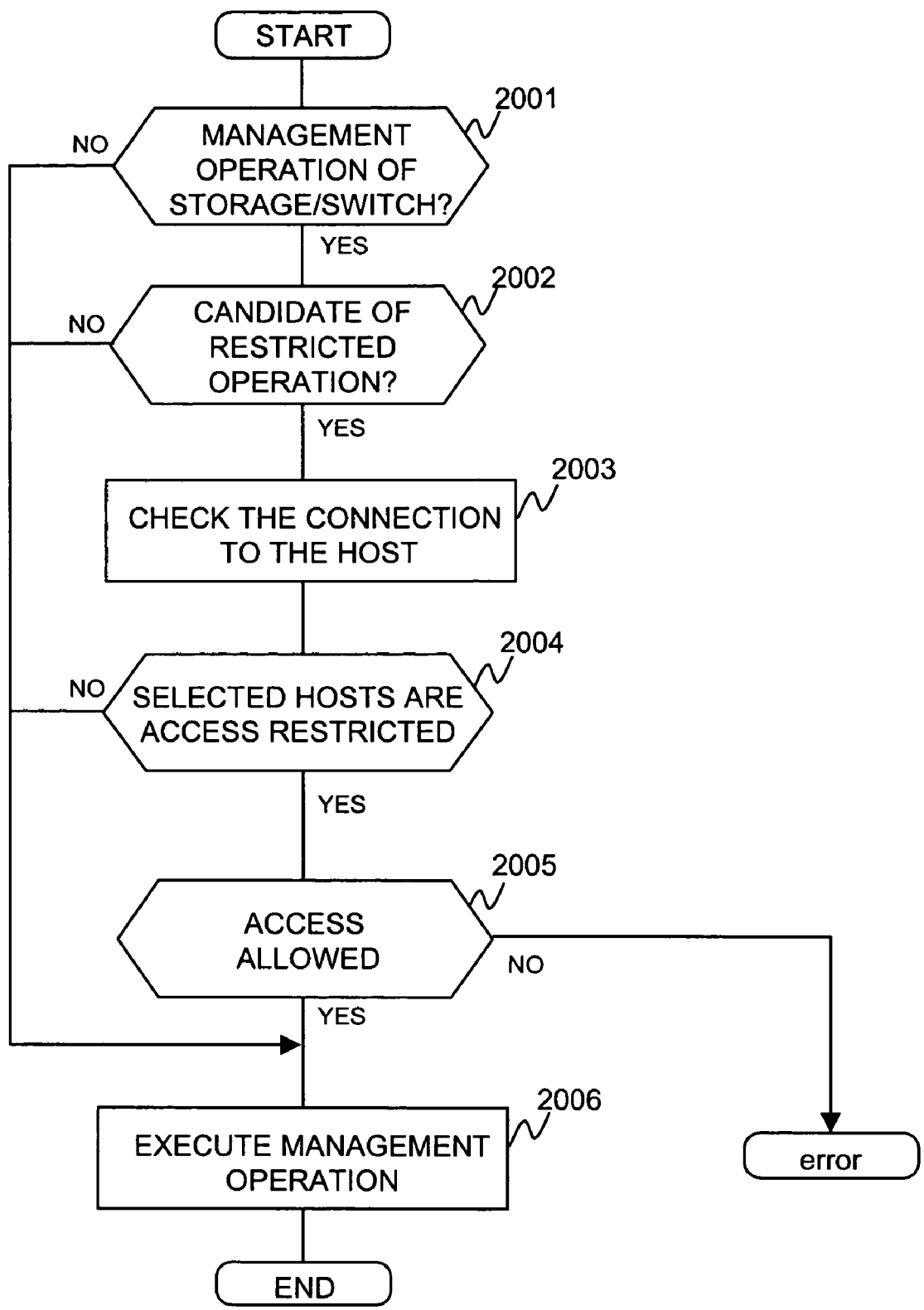
FIG. 8 is a flowchart illustrating the steps executed by the storage manager to judge whether a configuration of a storage network element can be changed according to the present invention.

FIG. 8 is a flowchart illustrating the steps executed by the storage manager 32 to judge whether a configuration of a storage network element can be changed. Thus, the storage manager 32 judges if the configuration of a selected or designated storage network element, including the storage systems 2 or the Fibre Channel Switches 4a-k, can be changed. The present invention is predicated on the fact that a viewing operation can be executed at any time and that a changing/modifying operation may be restricted on a time basis. In an alternative embodiment, the viewing operation may also be restricted based on time. The steps of the flowchart illustrated in FIG. 8 could, for example, correspond to instructions or sections of code of a computer program executed by the CPU (not shown) of the management host computer 3. The computer program can, for example, be stored on a storage medium that may be a floppy disk, CD Rom, memory (not shown) included in the management host computer 3, etc.

As illustrated in FIG. 8, the storage manager 32 checks if the operation requested by a user operating the management host computer 3 to be performed on a storage network element is an operation related to the management of the storage systems 2a-m or Fibre Channel switches 4a-k by referring to the restricted operation table 500 (Step 2001). Some of the requests for operations that the storage manager 32 receives from the users do not affect the configuration of the storage systems 2a-m or the Fibre Channel switches 4a-k. For example, the operation to add a user account to the storage manager 32, or changing the GUI settings of the storage manager 32 changes the configuration information of the storage manager 32 itself. However, such changes do not affect the configuration of the storage systems 2a-m or Fibre Channel switches 4a-k. If the operation is related to the configuration of the storage system 2a-m or Fibre Channel switches 4a-k, the process proceeds to Step 2002. If not, the process proceeds to Step 2006.

Thereafter, the storage manager 32 judges if the operation requested by the user is one of the predetermined restricted operations based on the operation lists in the restricted operation table 500 (Step 2002). If the operation is one of the predetermined restricted operations, then the process proceeds to step 2003. If the operation is not one of the predetermined restricted operations, then the process proceeds to step 2006 and the requested operation is executed. According to Step 2003, the storage manager 32 determines, based on the volume management table 300, the zone management table 350, and the host management table 200, which of the host computers 1a-n the storage network element is related. The storage manager 32 checks the restricted time field 204 of each of the host computers 1a-n that are determined in step 2003 to be related to the storage network element so as to determine whether these fields indicate that access is restricted (Step 2004). If access is restricted in one or more of the host computers 1a-n, then the process proceeds to step 2005. If access is not restricted in the host computers 1a-n, then the process proceeds to Step 2006.

According to Step 2005 the storage manager 32 compares the current time with the restricted time field 204 of each of the host computers of the host management table 200, and judges if the management operation can be executed. If the operation can be executed, then the process proceeds to step 2006. If the operation can not be executed, then the process ends with error and an error message is returned to the user, for example, by displaying the error message on the GUI.

According to Step 2006 the storage manager 32 executes the operation requested by the user. Since the details of the execution of management operations are well known in the art, they are not described herein in detail.

When the storage network elements have an operation prohibiting function, the process flow described above is executed by the storage manager 32. However, in an alternative embodiment, the storage network elements, including for example, the storage systems 2a-m or Fibre Channel Switches 4a-k, may have the function to prohibit configuration change operation during a specified period of time. In this embodiment the storage manager 32 can, for example, instruct the storage network elements the time information when the configuration change operation can not be processed.

Figure 9:
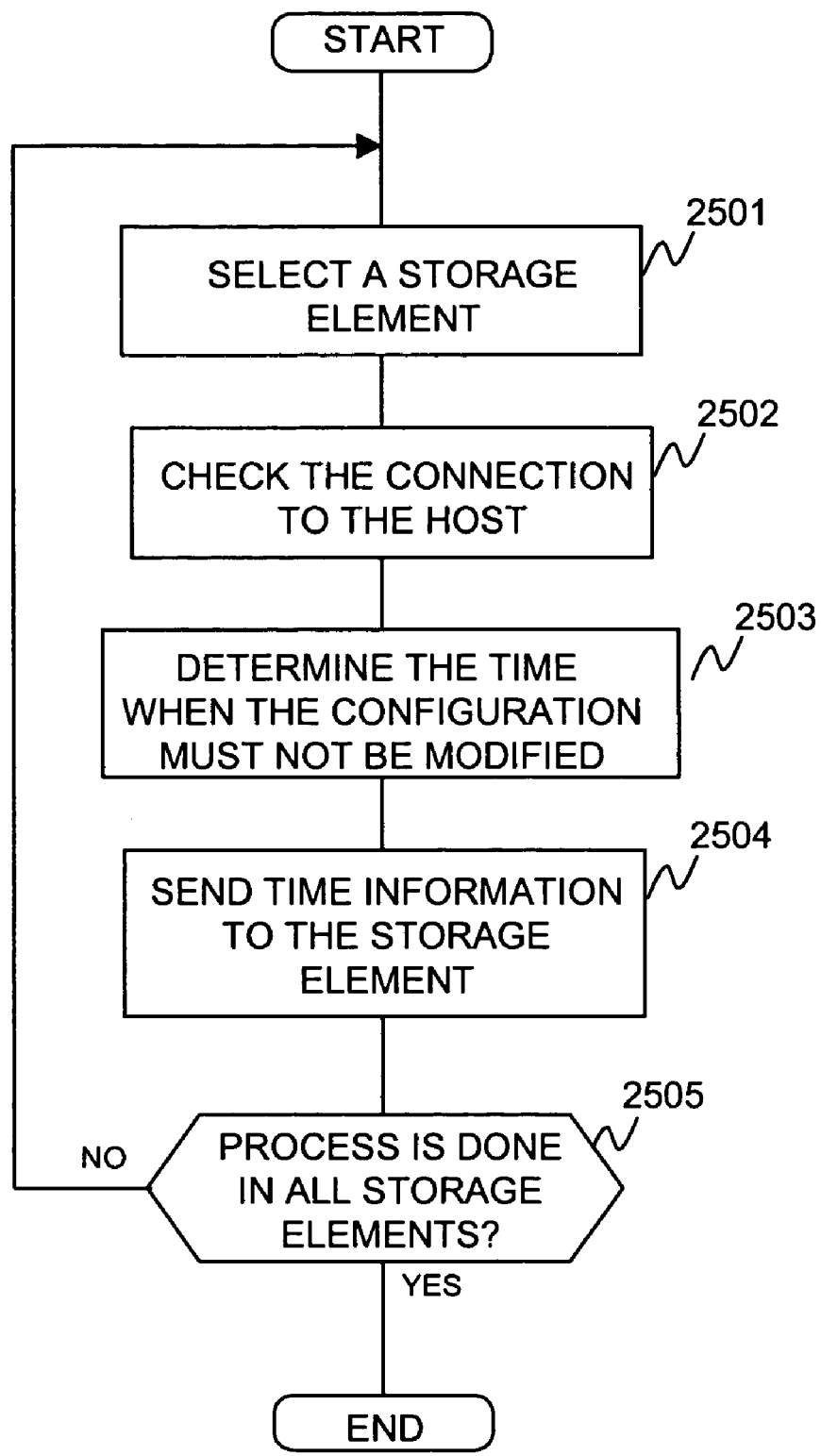
FIG. 9 is a flowchart illustrating the steps executed by the storage manager or a storage network element when an user attempts to change restricted time information according to the present invention.

FIG. 9 illustrates an operation that is performed by the storage manager 32. This operation can also be performed in the Fibre Channel switches 4a-k or each of the storage systems 2a-m. This operation is executed when users input or update the restricted time field 204 of the host management table 200 illustrated in FIG. 5. The steps of the flowchart illustrated in FIG. 9 could, for example, correspond to instructions or sections of code of a computer program executed by the CPU (not shown) of the management host computer 3, a CPU (not shown) in the Fibre Channel Switch 4 or the disk controller 22 of each storage system 2a-m. The computer program can, for example, be stored on a storage medium that may be a floppy disk, CD Rom, memory (not shown) included in the management host computer 3, etc.

According to the operation as illustrated in FIG. 9, the storage manager 32 selects one of the storage network elements in which the operation has not been completed (Step 2501). The storage manager 32 then determines, based on the volume management table 300, the zone management table 350, and the host management table 200, to which of the host computers 1a-n the storage network element is related (Step 2502). Step procedure as performed in Step 2003. By performing Step 2502, all host computers 1a-n that are related to the selected storage network element are determined.

The storage manager 32 checks the restricted time field 204 of the host management table 200 of all host computers 1a-n that are determined to be related to the selected storage network element to determine whether access is restrict according to the host computers 1a-n, and determines the period that the configuration of the selected storage network element must not be changed (Step 2503). Step 2503 is the same as step 2005 as illustrated in FIG. 8.

The storage manager 32 sends the time information that is determined in step 2503 to the storage network element (Step 2504). If this operation has been executed in all of the storage network elements, then the operation ends. If this operation has not been executed in all of the storage network elements, then the operation returns to step 2501 to select another storage network element for which the operation has not been completed (Step 2505).

In the above described embodiment wherein the storage network elements have the function to prohibit configuration change operation during a specified period of time, the application programs 14 may also issue management operation requests to each of the storage network elements via HBA 12, in addition to via NIC 11. That is, the management operation requests may be transmitted to each of the storage network elements via the same data transmission lines that the ordinal I/O requests use.

Another embodiment of the present invention provides for implementing user level access restriction. The system configuration of this embodiment is the same as in the embodiment illustrated in FIG. 1. However, in this embodiment the method for determining whether the changing/modifying operation can be allowed or not is determined based on the access privileges assigned to the users.

FIG. 10 illustrates another embodiment of a host management table 200' which is used in this other embodiment. According to the present invention instead of the restricted time field 204 of the host management table 200 as illustrated in FIG. 5, the host management table 200' as illustrated in FIG. 10 has a restriction field 204'. This field indicates whether configuration changes of the storage systems 2a-m or the Fibre Channel switches 4a-k that are related to the host computers 1a-n as specified in the host computer field 201 are restricted. This restriction could correspond to a certain period of time. If configuration changes are restricted, then the restriction field 204' includes a "YES". If not, then the restriction field 204' includes a "NO". Of course these indications can, for example, correspond to a certain period of time.

FIG. 11 illustrates a user management table 600. The user management table manages information regarding each of the users of the management host computer 3. As illustrated in FIG. 11 the user management table 600 includes a User Identifier (ID) field 601 which contains unique IDs identifying each of the users, and a User Level field 602 which indicates the privilege levels of the users, wherein each level confers a different level of the access rights. According to the present invention three kinds of levels are defined, namely high, mid and low. The differences in the privileges assigned to each of the levels are illustrated in a user level information table 650 in FIG. 12 as will be described below.

The user management table 600 illustrated in FIG. 11 further includes a description field 603. This field is used for storing detailed information about each user. This field may, for example, be of a certain length (e.g. 255 bytes) of ASCII characters. Other information may also be managed in the user management table 600.

FIG. 12 illustrates the user level information table 650 briefly described above. The user level information table 650 indicates in a user level field 651 the access level assigned to each user and in a restricted time field 652 what time the users cannot change the configurations of the storage systems 2a-m or the Fibre Channel Switches 4a-k. Thus, according to the present invention, users having a "High" user level are not restricted as to when they can change configurations because the restricted time 652 field is NULL (it does not contain time information). Users having a "Mid"

user level or lower cannot change the configurations during the time period of 9:00-17:00 since the restricted time field 652 is 9:00-17:00. Users having a "Low" user level cannot at any time change the configurations since the restricted time field 652 is 0:00-24:00.

Figure 13:
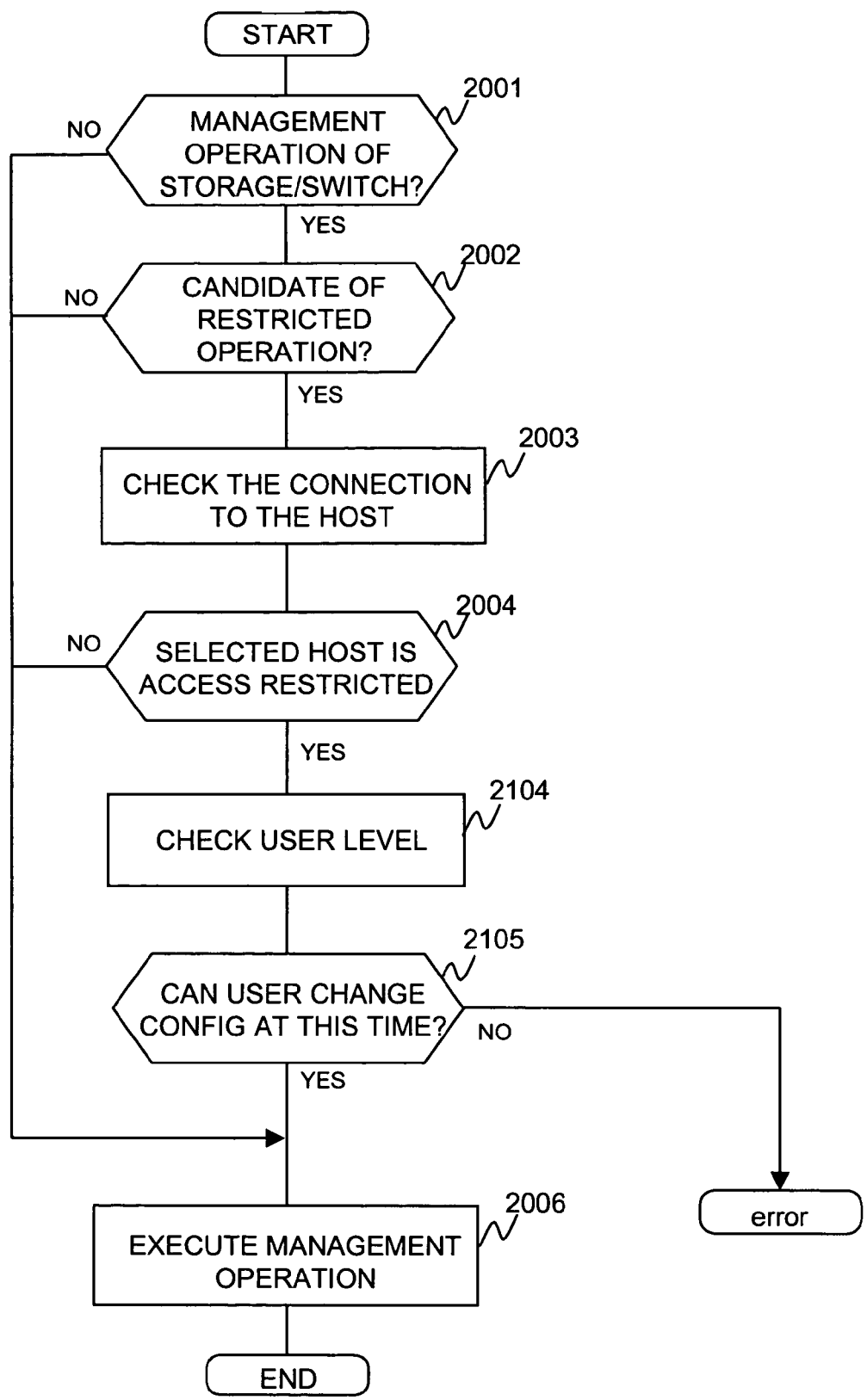
FIG. 13 is a flowchart illustrating the steps executed by another embodiment of the storage manager to judge whether a configuration of a storage network element can be changed according to the present invention according to the present invention.

In the present invention according to the other embodiment, whether the changing/modifying operation can be done or not is determined by not only the relation between the host computers 1*a-n* and the storage systems 2 but also the level of access assigned to the users. FIG. 13 illustrates the process performed when the storage manager 32 judges whether the configuration of the designated element (storage systems 2*a-m* or Fibre Channel Switches 4*a-k*) can be changed according to the access level assigned to the users. This process is almost the same as the process illustrated in FIG. 8 with the difference being that a Step 2104 is inserted between Step 2004 and Step 2005 and that Step 2005 is replaced with a Step 2105. The steps of the flowchart illustrated in FIG. 13 could, for example, correspond to instructions or sections of code of a computer program executed by the CPU (not shown) of the management host computer 3. The computer program can, for example, be stored on a storage medium that may be a floppy disk, CD Rom, memory (not shown) included in the management host computer 3, etc.

Thus, according to the present invention in the Step 2104, the storage manager 32 checks the user level of the user requesting the change/modify operation using the user management table 600. In Step 2105 the storage manager 32, based on the user level detected in step 2104, compares the current time with the restricted time field 652 of the user level information table 650, and judges if the management operation can be executed. If the operation can be executed, then the process proceeds to step 2006. If the process can not be executed, then the process ends with error and an error message is returned to the user, for example, by displaying the error message on the GUI.

It should be noted that the functions described above as being performed by the storage management system 3 could, for example, be performed by one of the storage network elements including the storage systems 2*a-m* and the Fibre Channel Switches 4*a-k*.

Thus according to the present invention a method, apparatus and computer program is provided for limiting management operation of a storage network element by determining whether the storage network element is related to a host computer and whether the management operation is restricted based on the related host computer and a time at which the execution is to be conducted. According to the present invention restricted management operations can also be determined based on access levels assigned to the users. Therefore, by use of the present invention Storage Area Network (SAN) management can be implemented especially in an environment where security is required such as in online transaction systems.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A method of controlling storage management operation of a plurality of storage systems connected to a network in response to operation requests from users of a storage management system which is connected to said network, each of said storage systems being related to at least one of a plurality of host computers, said method comprising the steps of:

executing an application program on each said host computer whereby each said host computer accesses a particular related volume on a particular related storage system;

determining whether an operation request received from a user of said storage management system is related to management of a storage system of said plurality of storage systems;

if said operation request is related to management of a particular said storage system, determining whether said operation request is a restricted operation request directed to changing an ability of a particular one of said host computers to access the particular volume on the particular storage system with which the particular host computer is related;

if said operation request is said restricted operation request, determining a restricted time period during which execution of said operation request is not permitted, said restricted time period corresponding to when the application program is in use on said particular host computer; and when a comparison of said restricted time period with the current time shows that said application program is in use, rejecting execution of said operation request.

2. The method according to claim 1, further including a step of determining whether said operation request is a restricted operation request by determining whether said operation request is one of:

attaching the particular volume to or detaching the particular volume from the particular host computer, or allowing or prohibiting access to the particular volume from the particular host computer.

3. The method according to claim 1, wherein said particular storage system carries out said steps of determining the restricted time period, comparing the restricted time period with the current time and rejecting execution of said operation request.

4. The method according to claim 1, wherein said step of determining whether said operation request is a restricted operation request is performed using a restricted operation table which indicates which operation requests are restricted operation requests, said table including restricted operation requests for detaching a logical unit and masking a logical unit.

5. The method according to claim 1, further including a step of determining which of said host computers are related to which of said storage systems by referring to a host management table which indicates which of said host computers are related to which of said storage systems.

6. The method according to claim 3, further including steps of:

providing a storage manager on a management computer in communication with said plurality of storage systems;

receiving by said storage manager updated restricted time period information for at least one of said host computers; and for each storage system affected by said updated restricted time period information, sending by said storage manager to said affected storage system the updated restricted time period information.

7. The method according to claim 1, further including a step of:

providing a storage manager on a management computer in communication with said plurality of storage systems, said storage manager carrying out said steps of determining the restricted time period, comparing the restricted time period with the current time and rejecting execution of said operation request.

8. A method of controlling storage management operation of a plurality of storage systems connected to a network in response to operation requests from users of a storage management system which is connected to said network, each of said storage systems being related to at least one of a plurality of host computers, said method comprising the steps of:
  executing an application program on each said host computer whereby each said host computer accesses a particular related volume on a particular related storage system;
  determining whether an operation request received from a user of said storage management system is related to management of a storage system of said plurality of storage systems;
  if said operation request is related to management of a particular said storage system, determining whether said operation request is a restricted operation request directed to changing an ability of a particular one of said host computers to access the particular volume on the particular storage system with which the particular host computer is related;
  if said operation request is said restricted operation request, determining a restricted time period during which execution of said operation request is not permitted said restricted time period corresponding to when the application program is in use on said particular host computer, such that said execution of said operation request is permitted if said application program is not in use on said particular computer;
  when a comparison of said restricted time period with the current time shows that said execution of said operation request is permitted on said storage system, determining whether the user is allowed to execute said operation request on said storage network element; and
  if the user is allowed to execute said operation request, executing said operation request on said storage network element.

9. The method according to claim 8, further including a step of determining whether said operation request is a restricted operation request by determining whether said operation request is one of:
  attaching the particular volume to or detaching the particular volume from the particular host computer, or
  allowing or prohibiting access to the particular volume from the particular host computer.

10. The method according to claim 8, wherein said particular storage system carries out said steps of determining the restricted time period, comparing the restricted time period with the current time and permitting execution of said operation request.

11. The method according to claim 8, wherein said step of determining whether said operation request is said restricted operation request is performed using a restricted operation table which indicates which operation requests are restricted operation requests, said table including restricted operation requests for detaching a logical unit and masking a logical unit.

12. The method according to claim 8, further including a step of determining which of said host computers are related to which of said storage systems by referring to a host management table which indicates which of said host computers are related to which of said storage systems.

13. The method according to claim 10, further including steps of:
  providing a storage manager on a management computer in communication with said plurality of storage systems;
  receiving by said storage manager updated restricted time period information for at least one of said host computers; and
  for each storage system affected by said updated restricted time period information, sending by said storage manager to said affected storage system the updated restricted time period information.

14. The method according to claim 8, further including a step of:
  providing a storage manager on a management computer in communication with said plurality of storage systems, said storage manager carrying out said steps of determining the restricted time period, comparing the restricted time period with the current time and permitting execution of said operation request.

15. The method according to claim 8, wherein said step of determining whether the user is allowed to execute said operation request on said storage network element is performed based on user management and user level information tables which indicate relations between access levels of said users and restricted times during which users having a particular access level or lower cannot conduct restricted operation requests.

16. A storage management system for controlling storage management operation of a plurality of storage systems connected to a network in response to operation requests from users of said storage management system which is connected to said network, each of said storage systems being related to at least one of a plurality of host computers, and each of said host computers executing an application program, whereby each said host computer accesses a particular related volume on a particular related storage system, said storage management system comprising:
  a network interface which connects said storage management system to the network; and
  a storage manager which determines whether an operation request received from a user of said storage management system is related to management of a storage system of said plurality of storage systems, if said operation request is related to management of said storage system, determines whether said operation request is a restricted operation request directed to changing an ability of a particular one of said host computers to access the particular volume on the particular storage system with which said particular host computer is related, if said operation request is said restricted operation request, determines a restricted time period during which execution of said operation request is not permitted on said particular storage system, said restricted time period corresponding to when said application program is in use, and when a comparison of said restricted time period with the current time shows that said application program is in use, rejecting execution of said operation request on said storage network element.

17. The storage management system according to claim 16, wherein said storage manager determines whether said operation request is a restricted operation request by determining whether said operation request is one of:

attaching the particular volume to or detaching the particular volume from the particular host computer, or allowing or prohibiting access to the particular volume from the particular host computer.

18. The storage management system according to claim 16, wherein said particular storage system carries out said steps of determining the restricted time period, comparing the restricted time period with the current time and rejecting execution of said operation reguest.

19. The storage management system according to claim 16, wherein said operation of determining whether said operation request is said restricted operation request is performed using a restricted operation table which indicates which operation requests are restricted operation requests, said table including restricted operation requests for detaching a logical unit and masking a logical unit.

20. The storage management system according to claim 16, wherein said operations further include determining which of said host computers are related to which of said storage systems by referring to a host management table which indicates which of said host computers are related to which of said storage systems.

21. The storage management system according to claim 18, further comprising
a storage manager on a management computer in communication with said plurality of storage systems,
wherein said storage manager receives updated restricted time period information for at least one of said host computers, and
wherein for each storage system affected by said updated restricted time period information, said storage manager sends to said affected storage system the updated restricted time period information.

22. The storage management system according to claim 16 further comprising:
a storage manager on a management computer in communication with said plurality of storage systems, said storage manager determining the restricted time period, comparing the restricted time period with the current time and rejecting execution of said operation reguest.

23. A storage management system for controlling storage management operation of a plurality of storage systems connected to a network in response to operation requests from users of said storage management system which is connected to said network, each of said storage system being related to at least one of a plurality of host computers, and each of said host computers executing an application program, whereby each said host computer accesses a particular related volume on a particular related storage system, said storage management system comprising:
a network interface which connects said storage management system to the network; and
a storage manager which determines whether an operation request received from a user of said storage management system is related to management of a storage system of said plurality of storage systems, if said operation request is related to management of a storage system, determines whether said operation request is a restricted operation request directed to changing an ability of a particular one of said host computers to access the particular volume on the particular storage system with which the particular host computer is related, if said operation request is said restricted operation request, determines a restricted time period during which execution of said operation request is not permitted on said storage system, said restricted time period corresponding to when the application program is in use, such that a comparison of said restricted time period with the current time shows that said execution of said operation request is permitted if said application program is not in use, if said execution of said operation request is permitted, determines whether the user is allowed to execute said operation request on said storage network element; and if the user is allowed to execute said operation request, executes said operation request on said storage network element.

24. The storage management system according to claim 23, wherein said storage manager determines whether said operation request is a restricted operation request by determining whether said operation request is one of:
attaching the particular volume to or detaching the particular volume from the particular host computer, or
allowing or prohibiting access to the particular volume from the particular host computer.

25. The storage management system according to claim 23, wherein said wherein said particular storage system carries out said steps of determining the restricted time period, comparing the restricted time period with the current time and rejecting execution of said operation reguest.

26. The storage management system according to claim 23, wherein said operation of determining whether said operation request is said restricted operation request is performed using a restricted operation table which indicates which operation requests are restricted operation requests said table including restricted operation requests for detaching a logical unit and masking a logical unit.

27. The storage management system according to claim 23, wherein said operations further include determining which of said host computers are related to which of said storage systems by referring to a host management table which indicates which of said host computers are related to which of said storage systems.

28. The storage management system according to claim 25 further comprising
a storage manager on a management computer in communication with said plurality of storage systems,
wherein said storage manager receives updated restricted time period information for at least one of said host computers, and
wherein for each storage system affected by said updated restricted time period information, said storage manager sends to said affected storage system the updated restricted time period information.

29. The storage management system according to claim 23, further comprising:
a storage manager on a management computer in communication with said plurality of storage systems, said storage manager determining the restricted time period, comparing the restricted time period with the current time and rejecting execution of said operation reguest.

30. The storage management system according to claim 23, wherein said operation of determining whether the user is allowed to execute said operation request on said storage network element is performed based on user management and user level information tables which indicate relations between access levels of said users and restricted times during which users having a particular access level or lower cannot conduct restricted operation requests.

31. A computer program stored on a storage medium for controlling storage management operations of a plurality of storage systems connected to a network in response to operation requests from users of a storage management system which is connected to said network, each of said storage systems being related to at least one of a plurality of host computers, and each of said host computers executing an application program, whereby each said host computer accesses a particular related volume on a particular related storage system, wherein said computer program when executed causes said storage management system to perform the steps of:

determining whether an operation request received from a user of said storage management system is related to management of a storage system of said plurality of storage systems;

if said operation request is related to management of said storage network element, determining whether said operation request is a restricted operation request directed to changing an ability of a particular one of said host computers to access the particular volume on the particular storage system with which the particular host computer is related;

if said operation request is said restricted operation request, determining a restricted time period during which execution of said operation request is not permitted, said restricted time period corresponding to when the application program is in use on said particular host computer; and when a comparison of said restricted time period with the current time shows that said application program is in use, rejecting execution of said operation request on said storage system.

32. The computer program according to claim 31, further including a step of determining whether said operation request is a restricted operation request by determining whether said operation request is one of:

attaching the particular volume to or detaching the particular volume from the particular host computer, or allowing or prohibiting access to the particular volume from the particular host computer.

33. The computer program according to claim 31, wherein said particular storage system carries out said steps of determining the restricted time period, comparing the restricted time period with the current time and rejecting execution of said operation request.

34. The computer program according to claim 31, wherein said step of determining whether said operation request is said restricted operation request is performed using a restricted operation table which indicates which operation requests are restricted operation requests, said table including restricted operation requests for detaching a logical unit and masking a logical unit.

35. The computer program according to claim 31, further including a step of determining which of said host computers are related to which of said storage systems by referring to a host management table which indicates which if said host computers are related to which of said storage systems.

36. The computer program according to claim 33, further including steps of:

providing a storage manager on a management computer in communication with said plurality of storage systems;

receiving by said storage manager updated restricted time period information for at least one of said host computers; and for each storage system affected by said updated restricted time period information, sending by said storage manager to said affected storage system the updated restricted time period information.

37. The computer program according to claim 31, further including a step of:

providing a storage manager on a management computer in communication with said plurality of storage systems, said storage manager carrying out said steps of determining the restricted time period, comparing the restricted time period with the current time and rejecting execution of said operation request.

38. A computer program stored on a storage medium for controlling storage management operations of a plurality of storage system connected to a network in response to operation requests from users of a storage management system which is connected to said network, each of said storage systems being related to at least one of a plurality of host computers, and each of said host computers executing an application program, whereby each said host computer accesses a particular related volume on a particular related storage system, said computer program when executed causes said storage management system to perform the steps of:

determining whether an operation request received from a user of said storage management system is related to management of a storage system of said plurality of storage systems network elements;

if said operation request is related to management of said storage system, determining whether said operation request is a restricted operation request directed to changing an ability of a particular one of said host computers to access the particular volume on the particular storage system with which the particular host computer is related;

if said operation request is said restricted operation request, determining a restricted time period during which execution of said operation request is not permitted, said restricted time period corresponding to when the application program is in use on said particular host computer, such that said execution of said operation request is permitted when a comparison of said restricted time period with the current time shows that said application program is not in use;

if said execution of said operation request is permitted on said storage network element, determining whether the user is allowed to execute said operation request on said storage network element; and if the user is allowed to execute said operation request, executing said operation request on said storage network element.

39. The computer program according to claim 38, further including a step of determining whether said operation request is a restricted operation request by determining whether said operation request is one of:

attaching the particular volume to or detaching the particular volume from the particular host computer, or allowing or prohibiting access to the particular volume from the particular host computer.

40. The computer program according to claim 38, wherein said wherein said particular storage system carries out said steps of determining the restricted time period, comparing the restricted time period with the current time and rejecting execution of said operation request.

41. The computer program according to claim 38, wherein said step of determining whether said operation request is said restricted operation request is performed using a restricted operation table which indicates which operation requests are restricted operation requests said table including restricted operation requests for detaching a logical unit and masking a logical unit.

42. The computer program according to claim 38, further including a step of determining which of said host computers are related to which of said storage systems by referring to a host management table which indicates which of said host computers are related to which of said storage systems.

43. The computer program according to claim 40, further including steps of:
provided a storage manager on a management computer in communication with said plurality of storage systems;
receiving by said storage manager updated restricted time period information for at least one of said host computers; and
for each storage system affected by said updated restricted time period information, sending by said storage manager to said affected storage system the updated restricted time period information.

44. The computer program according to claim 38, further comprising
a storage manager on a management computer in communication with said plurality of storage systems,
wherein said storage manager receives updated restricted time period information for at least one of said host computers, and
wherein for each storage system affected by said updated restricted time period information, said storage manager sends to said affected storage system the updated restricted time period information.

45. The computer program according to claim 38, wherein said step of determining whether the user is allowed to execute said operation request on said storage network element is performed based on user management and user level information tables which indicate relations between access levels of said users and restricted times during which users having a particular access level or lower cannot conduct restricted operation requests.

46. A system comprising:
a network;
a plurality of storage elements connected to said network,
wherein each of said storage network elements is related to at least one of a plurality of host computers, each of said storage network elements is either a storage system or a network switch, and each said host computers executes an application program whereby each said host computer accesses a particular related volume on a particular related storage system; and
a storage management system, connected to said network, for controlling storage management operation of said storage network elements in response to operation requests from users of said storage management system,
wherein said storage management system comprises:
a network interface which connects said storage management system to the network, and
a storage manager which determines whether an operation request received from a user is related to management of a storage network element of said plurality of storage network elements, if said operation request is related to management of a storage network element, determines whether said operation request is a restricted operation request directed to changing an ability of a particular one of said host computers to access the particular volume on the particular storage system with which the particular host computer is related, if said operation request is said restricted operation request, determines a restricted time period during which execution of said operation request is not permitted, said restricted time period corresponding to when the application program is in use on said particular host computer, and when a comparison of said restricted time period with the current time shows that said application program is not in use, rejects execution of said operation request on said storage network element.

47. The system according to claim 46, wherein said storage manager determines whether said operation request is a restricted operation request by determining whether said operation request is one of:
attaching the particular volume to or detaching the particular volume from the particular host computer, or
allowing or prohibiting access to the particular volume from the particular host computer.

48. A system comprising:
a network;
a plurality of storage elements connected to said network,
wherein each of said storage network elements is related to at least one of a plurality of host computers, each of said storage network elements is either a storage system or a network switch, and each said host computers executes an application program whereby each said host computer accesses a particular related volume on a particular related storage system; and
a storage management system, connected to said network, for controlling storage management operation of said storage network elements in response to operation requests from users of said storage management system,
wherein said storage management system comprises:
a network interface which connects said storage management system to the network, and
a storage manager which determines whether an operation request received from a user of said storage management system is related to management of a storage network element of said plurality of storage network elements, if said operation request is related to management of said storage network element, determines whether said operation request is a restricted operation request, if said operation request is said restricted operation request directed to changing an ability of a particular one of said host computers to access the particular volume on the particular storage system with which the particular host is related, determines whether execution of said operation request is permitted by determining a restricted time period during which said application program is in use on said particular host computer, said restricted time period corresponding to when the application program is in use, if a comparison of said restricted time period with the current time shows that said execution of said operation request is permitted on said storage network element, determines whether the user is allowed to execute said operation request on said storage network element, and if the user is allowed to execute said operation request, executes said operation request on said storage network element.

49. The system according to claim 48, wherein said storage manager determines whether said operation request is a restricted operation request by determining whether said operation request is one of:
attaching the particular volume to or detaching the particular volume from the particular host computer, or
allowing or prohibiting access to the particular volume from the particular host computer.

* * * * *